United States Patent
Nolte et al.

(10) Patent No.: US 12,410,313 B2
(45) Date of Patent: Sep. 9, 2025

(54) MINERAL-REINFORCED CO-POLYESTER BLEND

(71) Applicant: Covestro Intellectual Property GmbH & Co. KG, Leverkusen (DE)

(72) Inventors: Marius Nolte, Cologne (DE); Ralf Hufen, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 707 days.

(21) Appl. No.: 17/615,607

(22) PCT Filed: Jun. 17, 2020

(86) PCT No.: PCT/EP2020/066784
§ 371 (c)(1),
(2) Date: Dec. 1, 2021

(87) PCT Pub. No.: WO2020/260096
PCT Pub. Date: Dec. 30, 2020

(65) Prior Publication Data
US 2022/0315755 A1    Oct. 6, 2022

(30) Foreign Application Priority Data
Jun. 28, 2019  (EP) .................... 19183125

(51) Int. Cl.
*C08L 67/02*    (2006.01)

(52) U.S. Cl.
CPC ......... *C08L 67/02* (2013.01); *C08L 2205/025* (2013.01)

(58) Field of Classification Search
CPC ... C08L 67/02; C08L 2205/025; C08G 63/16; C08G 63/183; C08G 63/199; C08G 63/672
See application file for complete search history.

(56) References Cited

U.S. PATENT DOCUMENTS

| | | | |
|---|---|---|---|
| 3,692,744 A | 9/1972 | Rene et al. | |
| 6,673,463 B1 | 1/2004 | Onishi et al. | |
| 9,676,903 B2 | 6/2017 | Lee et al. | |
| 2011/0039999 A1* | 2/2011 | Witt | C08G 18/73 524/879 |
| 2013/0316106 A1* | 11/2013 | Nakano | C08L 67/02 428/35.5 |
| 2018/0155493 A1* | 6/2018 | Jacquel | C08G 63/78 |
| 2019/0161574 A1* | 5/2019 | Im | C08G 63/16 |
| 2019/0169363 A1 | 6/2019 | Amedro et al. | |
| 2019/0169426 A1* | 6/2019 | Amedro | C08G 63/183 |
| 2020/0255655 A1* | 8/2020 | Lehenmeier | C08L 67/02 |

FOREIGN PATENT DOCUMENTS

| | | | |
|---|---|---|---|
| CN | 104231567 A | 12/2014 | |
| CN | 105802158 A | 7/2016 | |
| CN | 106832820 A | 6/2017 | |
| FR | 3054551 A1 * | 2/2018 | ........... B29C 48/022 |
| JP | 2019077823 A * | 5/2019 | |
| KR | 20190063016 A | 6/2019 | |
| WO | 2016099179 A1 | 6/2016 | |

OTHER PUBLICATIONS

Machine translation of JP 2019077823 A, retrieved Jul. 2024 (Year: 2024).*
International Search Report, PCT/EP2020/066784, date of mailing: Jul. 24, 2020, Authorized officer: Delphine Pouilley.
English Translation of the Written Opinion for PCT/EP2020/066784 filed on Jun. 24, 2020.

* cited by examiner

*Primary Examiner* — Katarzyna I Kolb
(74) *Attorney, Agent, or Firm* — John E. Mrozinski, Jr.

(57) ABSTRACT

The invention relates to a composition containing A) 60 to 80 wt. % of a polyester on the basis of terephthalic acid and at least one dianhydrohexitol and optionally additional diols, B) 10 to 30 wt. % of a polyester on the basis of succinic acid and at least one aliphatic, araliphatic or cycloaliphatic diol, and C) 3 to 12 wt. % of at least one mineral reinforcing material on the basis of talcum. The invention also relates to a method for producing a molding compound from the composition, to the molding compound itself and to moldings obtainable from the composition or the molding compound.

11 Claims, No Drawings

MINERAL-REINFORCED CO-POLYESTER BLEND

CROSS REFERENCE TO RELATED APPLICATIONS

This application is a national stage application (under 35 U.S.C. § 371) of PCT/EP2020/066784, filed Jun. 17, 2020, which claims benefit of European Application No. 19183125.4, filed Jun. 28, 2019, both of which are incorporated herein by reference in their entireties.

FIELD OF THE INVENTION

The present invention relates to a composition for producing a thermoplastic molding compound containing polyester and reinforcer, to a process for producing the molding compound and to the molding compound itself. The invention also relates to the use of the molding compound for producing molded articles and to the molded articles produced.

BACKGROUND OF THE INVENTION

Thermoplastic molding compounds are very widely used for a multiplicity of applications in virtually all aspects of everyday life. Especially through mixtures of different thermoplastics and addition of further additives and fillers the profiles of properties may be varied over wide ranges and adapted to the corresponding requirements.

Moreover in recent years the aspect of sustainability has moved sharply into focus for thermoplastic molding compounds. For packaging materials and single-use articles in particular, biodegradability of the molding compounds is desired to help to reduce plastic waste.

CN106832820 discloses a biodegradable single-use composite plastic cup and a production process therefor. The plastic cup made of degradable single-use compound is produced from the following raw materials: 45-55% PET, 25-35% poly(butylene succinate), 5-15% starch, 1-3% light degradation accelerator, 2-6% glass fiber, 1-3% heat stabilizer and 1-3% lubricant. The plastic cup features good heat resistance, biodegradability, a simple production process, high product stability and good quality.

CN 104231567 discloses a biodegradable fast-molding PET (polyethylene terephthalate)/PBS (polybutylene succinate) molding compound produced from the following parts by weight of the following materials: 100 parts of PET, 20-40 parts of PBS, 3-5 parts of nucleating agent, 2-3 parts of hardener, 15-30 parts of glass fiber and 0.5-1 parts of processing aid. The obtained molding compound has the advantages of favorable mechanical properties and a short forming cycle.

CN105802158 describes an anticorrosive and biodegradable PET-PBS molding compound. The PET-PBS molding compound is produced from 100 parts by weight of PET, 30-35 parts by weight of PBS, 5-10 parts of epoxy-modified alcohol ester, 5-10 parts of nano-$TiO_2$-modified dihydroxylpolydiphenylsiloxane, 3-5 part of a nucleating agent, 2-3 parts of a plasticizer, 15-30 parts of glass fibers and 0.5-1 parts of a processing aid. The molding compound has a good resistance to acids and bases while maintaining good degradability.

Another aspect of sustainability relates to the origin of the employed ingredients.

Some of the biodegradable thermoplastics or at least parts of the corresponding molecular structure are also obtainable from renewable raw materials. This allows the consumption of crude oil for plastics production to be reduced.

It is therefore desirable to develop compositions for producing thermoplastic molding compounds where at least a portion of the components may be produced from renewable raw materials. It is preferably desirable when the proportion of components produced from renewable raw materials is at least significant, preferably at least 5% by weight, more preferably at least 15% by weight, most preferably at least 20% by weight.

The particular challenge in the development of such materials is that of producing balanced profiles of properties allowing use in demanding technical applications, for example in the field of electronic and electrical devices, toys, automotive applications or other consumer goods.

It is especially desirable for such applications to achieve a good combination of flowability, toughness, heat resistance, stiffness and surface quality. Toughness may be evaluated for example as impact strength and/or as breaking elongation in a tensile test.

Good surface quality is to be understood as meaning that a visual high-gloss is achieved and the components show no streaking.

It is preferably desirable when the tensile elastic modulus achieves at least 1900 N/mm$^2$ and when the impact strength is sufficiently high for the test specimens not to fracture at room temperature.

DETAILED DESCRIPTION OF THE INVENTION

It has been found that, surprisingly, the advantageous properties are exhibited by a composition containing
  A) 60% to 80% by weight, preferably 65% to 72% by weight, of a polyester based on terephthalic acid and at least one dianhydrohexitol and optionally further diols,
  B) 10% to 30% by weight, preferably 18% to 20% by weight, of a polyester based on succinic acid and at least one aliphatic, araliphatic or cycloaliphatic diol,
  C) 3% to 12% by weight, preferably 4% to 10% by weight, of at least one mineral reinforcer based on talc.

In component A the further polyols are preferably selected from the group consisting of cyclohexanedimethanol, ethylene glycol, butanediol, propanediol and tetramethylcyclobutanediol. As component C it is preferable to employ talc.

As component D the composition may further contain 0% to 20% by weight, preferably 0.1% to 10% by weight, of polymer additives.

The composition preferably consists to an extent of at least 90% by weight of components A to D. The composition particularly preferably consists only of components A to D.
Component A As component A the composition contains a polyester based on terephthalic acid and at least one dianhydrohexitol (isohexide) and optionally further diols.

Based on terephthalic acid and at least one dianhydrohexitol and optionally further diols is to be understood as meaning that the polyester contains structural units derived from terephthalic acid and at least one dianhydrohexitol and optionally further diols.

The further diols are preferably selected from the group consisting of cyclohexanedimethanol, ethylene glycol, butanediol, propanediol and tetramethylcyclobutanediol.

Polyesters in the context of the present description is also to be understood as meaning polyesters containing not only terephthalic acid radicals but also up to 25 mol % of radicals of further dicarboxylic acids selected from phthalic acid, isophthalic acid, naphthalene-2,6-dicarboxylic acid and 4,4'-diphenyldicarboxylic acid.

If the proportion of terephthalic acid radicals is too low, physical properties, heat resistance and chemical resistance may be impaired.

The polyester preferably contains only structural units derived from terephthalic acid and isophthalic acid as the dicarboxylic acid, most preferably only from terephthalic acid.

In the production of the polyesters it possible to proceed either from terephthalic acid and the further recited acids or from alkyl esters or anhydrides of the corresponding acids.

It is possible and preferable for the dianhydrohexitol to be produced from renewable raw materials such as for example naturally occurring sugar alcohol.

As the dianhydrohexitol it is further preferable to employ isosorbide. This also has an advantageous effect on heat resistance and chemical resistance.

Component A is preferably a polyester based on terephthalic acid and a mixture of isosorbide, cyclohexanedimethanol and ethylene glycol.

The diol component may contain 5 to 60 mol % of isosorbide and 5 to 80 mol % of cyclohexanedimethanol, in each case based on the diol component. The remaining proportions are then derived from ethylene glycol.

The production of the polyesters of component A is known. It may be effected by esterification in the presence of a catalyst such as for example a zinc compound with subsequent polycondensation. This may be done under vacuum and the reaction may be performed for example at a temperature between 150° C. and 300° C.

The polycondensation may employ further catalysts containing titanium, germanium, tin, aluminum or antimony and mixtures of different catalysts.

The reaction may be performed continuously or discontinuously. The metered addition of the raw materials may be effected separately or a pre-mixing may be undertaken.

The polyesters of component A exhibit a weight-average molecular weight $M_w$ of preferably 10 to 100 kg/mol, measured for example by gel permeation chromatography in 1,1,1,3,3,3-hexafluoro-2-propanol in a concentration of 1 g/L using a polyethylene terephthalate standard.

The polyesters moreover preferably have a melt volume flow rate (MVR) of 3-30 $cm^3$/10 min, preferably of 5 to 20 $cm^3$/10 min, in each case measured according to ISO 1133 (2012) at 240° C. and a loading of 5 kg.

The production of a polyester of component A is described for example in EP 2 955 204 B1.

Component B

As component B the composition contains according to the invention a further polyester or mixtures of further polyesters.

The polyesters of component B are reaction products of succinic acid or reactive derivatives thereof and aliphatic, cycloaliphatic or araliphatic diols and mixtures of these reaction products. It is also possible for a portion of the succinic acid to be replaced by another acid.

Preferred polyesters are producible from succinic acid (or its reactive derivatives) or from mixtures of succinic acid and up to 20 mol % of radicals of other aromatic dicarboxylic acids having 8 to 14 C atoms or aliphatic dicarboxylic acids having 4 to 12 C atoms such as radicals of phthalic acid, isophthalic acid, naphthalene-2,6-dicarboxylic acid, 4,4'-diphenyldicarboxylic acid, adipic acid, sebacic acid, azelaic acid, cyclohexanediacetic acid, cyclohexanedicarboxylic acid, and aliphatic diols having 2 to 10 C atoms, for example ethanediol, propylene glycol, butanediol or pentanediol, by known methods such as condensation polymerization of dicarboxylic acid compounds or functional derivatives such as anhydrides or chlorides on the one hand and diols on the other. The condensation polymerization may be carried out in solution, in the melt or in solid phase, or in a combination of reaction steps in different phases.

In a further embodiment the polyester polymer is an aliphatic polyalkylene succinate. In yet a further embodiment the polyester polymer is selected from the group consisting of polyethylene succinate, polyethylene succinate-co-adipate, polyethylene succinate-co-terephthalate, polybutylene succinate, polybutylene succinate-co-adipate and polybutylene succinate-co-terephthalate.

Succinate esters produced solely from succinic acid or reactive derivatives thereof (e.g. dimethyl esters or anhydrides) and a diol are particularly preferred.

In a preferred embodiment diols of the present invention are aliphatic diols. In a more preferred embodiment the diols are alkanediols having 2 to 10 C atoms. Diols selected from the group comprising ethanediol, propanediol, butanediol and pentanediol are particularly preferred and butanediol is most preferred. In the most preferred embodiment a polyester made from succinic acid and butanediol is used.

In a preferred embodiment coupling agents are used to increase the molecular weight. Examples of such coupling agents are 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate and isophorone diisocyanate. It is preferable to use hexamethylene diisocyanate and isophorone diisocyanate.

The production of the polyesters according to the invention is described for example in EP 0707047 A2.

The succinate esters may be branched by incorporation of relatively small amounts of tri- or tetrahydric alcohols or tri- or tetrabasic carboxylic acid, as described for example in DE 1900270 A1 and U.S. Pat. No. 3,692,744 (A). Examples of preferred branching agents are trimesic acid, trimellitic acid, trimethylolethane, trimethylolpropane and pentaerythritol. A particularly preferred branching agent is trimethylolpropane, most preferably 1,1,1-trimethylolpropane. It is advisable to use not more than 1% by weight of the branching agent based on the polyester.

The preferably used succinate esters have weight-average molecular weights $M_w$ of 10 to 1500 kg/mol (determined by gel permeation chromatography against a polystyrene reference, solvent dichloromethane, concentration 6 g/l), preferably of 15 to 750 kg/mol, yet more preferably of 40 to 500 kg/mol and particularly preferably of 80 to 400 kg/mol.

The polyesters of component B moreover preferably have a melt volume flow rate (MVR) of 3-30 $cm^3$/10 min, more preferably of 5 to 20 $cm^3$/10 min, in each case measured according to ISO 1133 (2012) at 240° C. and a loading of 5 kg.

Succinic acid used as the acid component may derive from biological sources, i.e. may be obtained from renewable raw materials, for example by fermentation of glucose or from hydrolyzates of biomass. Such a succinic acid is preferred.

In a particularly preferred embodiment the polyester is a polybutylene succinate having a weight-average molecular weight of 80 to 400 kg/mol (determined by gel permeation chromatography against a polystyrene reference).

During production the corresponding dicarboxylic diester is typically initially formed in an esterification or transesterification reaction at temperatures of about 150° C. to 300° C. and this is then subjected to polycondensation at increasing temperature and reduced pressure, the corresponding hydroxyl compounds and/or water being eliminated. The last stages of the reaction are carried out generally under high vacuum (<10 mm mercury column), in order to prepare a polyester polymer with high molecular weight.

Both reaction steps may optionally be carried out using esterification catalysts and/or transesterification catalysts and/or polycondensation catalysts. Customary catalysts include Ti, Zr, Sn and Sb compounds for the esterification, Mn, Co and Zn compounds for the transesterification, and Sb, Ti, Pb, Ge, Zn and Sn compounds for the polycondensation, the compounds being selected in general from the group encompassing oxides, alkoxides, acetates and carboxylates. The metal content of the catalyst is customarily between 20 and 500 ppm, based on 100 parts by weight of polyester polymer.

Component B preferably has a glass transition temperature of −50° C. to 90° C., particularly preferably −45° C. to 0° C. Component B preferably has a melting point of 80° C. to 260° C., more preferably of 85° C. to 180° C. and yet more preferably of 90° C. to 125° C.

The glass transition temperature is determined according to DIN 53765 at a heating rate of 20 K using nitrogen inert gas, the glass transition temperature being determined as the point of intersection of the middle line between the extrapolated baselines before and after the glass transition of the measurement plot.

Component C

Component C is a mineral reinforcer based on talc.

Suitable mineral reinforcers based on talc in the context of the invention are any particulate reinforcers that the person skilled in the art associates with talc or talcum. Also suitable are all particulate reinforcers that are commercially available and whose product descriptions contain as characterizing features the terms talc or talcum.

Mixtures of various mineral reinforcers based on talc can also be used.

Mineral reinforcers according to the invention have a talc content according to DIN 55920 (2006 version) of more than 80% by weight, preferably more than 95% by weight and particularly preferably more than 98% by weight based on the total mass of filler.

Talc is to be understood as meaning a naturally occurring or synthetically produced talc.

Pure talc is a silicate having a layered structure.

Talc is to be understood as meaning a naturally occurring or synthetically produced talc.

The talc types employed as component E feature a particularly high purity, characterized by an MgO content of 28% to 35% by weight, preferably 30% to 33% by weight, particularly preferably 30.5% to 32% by weight, and an $SiO_2$ content of 55% to 65% by weight, preferably 58% to 64% by weight, particularly preferably 60% to 62.5% by weight.

The particularly preferred talc grades further feature an $Al_2O_3$ content of less than 5% by weight, more preferably less than 1% by weight, especially less than 0.7% by weight.

Especially also advantageous and thus preferred is the use of the talc according to the invention in the form of finely ground grades having a median particle size $d_{50}$ of 0.2 to 10 μm, preferably 0.5 to 5 μm, more preferably 0.7 to 2.5 μm, and particularly preferably 0.8 to 2.0 μm.

The median particle size $d_{50}$ is the diameter with 50% by weight of the particles above it and 50% by weight of the particles below it. It is also possible to use mixtures of talc grades which differ in their $d_{50}$ median particle size.

The talc grades to be used according to the invention preferably have an upper particle or grain size $d_{97}$ below 50 μm, preferably below 10 μm, particularly preferably below 6 μm and especially preferably below 2.5 μm. The $d_{97}$ and $d_{50}$ values of the talc are determined by sedimentation analysis, using a Sedigraph 5100 (Micromeritics GmbH, Erftstrasse 43, 41238 Monchengladbach, Germany) in accordance with ISO 13317-1 and ISO 13317-3 (2000 version).

The talc may be surface-treated, for example silanized, to ensure better compatibility with the polymer. The talc may, for example, have been modified with an adhesion promoter system based on functionalized silanes.

The use of compacted talc is also advantageous having regard to the processing of the composition and the molding compounds produced therefrom.

As a result of the processing to afford the molding compound/molded articles the employed talc may have a smaller $d_{97}/d_{50}$ in the molding compound/in the molded article than in the originally employed form.

Component D

As component D the composition according to the invention may contain one or more polymer additives preferably selected from the group consisting of flame retardants, anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, impact modifiers (either with or without a core-shell structure), further polymeric constituents distinct from components A and B (for example functional blend partners), fillers and reinforcers distinct from component C and dyes and pigments.

In a preferred embodiment the composition contains no further fillers and reinforcers.

In a preferred embodiment the composition contains at least one polymer additive selected from the group consisting of lubricants and demolding agents, stabilizers, flow promoters, phase compatibilizers, further impact modifiers, further polymeric constituents, dyes and pigments.

In a preferred embodiment the composition contains pentaerythritol tetrastearate as a demolding agent.

In a preferred embodiment the composition contains as a stabilizer at least one representative selected from the group consisting of sterically hindered phenols, organic phosphites and sulfur-based co-stabilizers.

In a particularly preferred embodiment the composition comprises as a stabilizer at least one representative selected from the group consisting of octadecyl-3-(3,5-di-tert-butyl-4-hydroxyphenyl)propionate and tris(2,4-di-tert-butylphenyl)phosphite.

In a particularly preferred embodiment the composition contains as component D at least one representative selected from the group consisting of lubricants and demolding agents, stabilizers and dyes and pigments and is free from other polymer additives of component D.

Production of the Molding Compounds and Molded Articles

The composition according to the invention may be used to produce thermoplastic molding compounds. The thermoplastic molding compounds may be produced for example when the respective constituents of the composition are in familiar fashion mixed and melt-compounded and melt-extruded at temperatures of preferably 200° C. to 320° C., particularly preferably at 220° C. to 290° C., very particularly preferably at 230° C. to 270° C., in customary apparatuses such as internal kneaders, extruders and twin-screw extruders for example. In the context of the present application, this process is generally referred to as compounding.

The term "molding compound" is thus to be understood as meaning the product obtained when the constituents of the composition are melt-compounded and melt-extruded.

The mixing of the individual constituents of the compositions may be carried out in a known manner, either successively or simultaneously, either at about 20° C. (room temperature) or at a higher temperature. This mean that for example some of the constituents may be introduced via the main intake of an extruder and the remaining constituents may be introduced later in the compounding process via a side extruder.

The molding compounds according to the invention may be used to produce molded articles of any kind. These may be produced by injection molding, extrusion and blow-molding processes for example A further form of processing is the production of molded articles by thermoforming from previously produced sheets or films. The molding compounds according to the invention are particularly suitable for processing by extrusion, blow-molding and thermoforming methods.

The constituents of the composition may also be metered directly into an injection molding machine or into an extrusion apparatus and processed into molded articles.

Examples of such molded articles that are producible from the composition and molding compounds according to the invention are films, profiles, housing parts of any kind, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications) and also electrical and electronic components such as switches, plugs and sockets, and parts for commercial vehicles, in particular for the automotive sector. The compositions and molding compounds according to the invention are also suitable for producing the following molded articles or moldings: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, molded parts for sanitation and bath equipment, protective grilles for ventilation openings and housings for garden equipment.

Further embodiments 1 to 19 are described hereinbelow:
1. Composition containing
    A) 60% to 80% by weight of a polyester based on terephthalic acid and at least one dianhydrohexitol and optionally further diols,
    B) 10% to 30% by weight of a polyester based on succinic acid and at least one aliphatic, araliphatic or cycloaliphatic diol,
    C) 3% to 12% by weight of at least one mineral reinforcer based on talc.
2. Composition according to embodiment 1, characterized in that component A contains only structural units derived from terephthalic acid and isophthalic acid as the dicarboxylic acid.
3. Composition according to embodiment 1, characterized in that component A contains only structural units derived from terephthalic acid as the dicarboxylic acid.
4. Composition according to any of the preceding embodiments, characterized in that component A contains structural units derived from dianhydrohexitol and in that the dianhydrohexitol is produced from renewable raw materials.
5. Composition according to any of the preceding embodiments, characterized in that component A is a polyester based on terephthalic acid and at least one dianhydrohexitol and optionally further diols selected from the group consisting of cyclohexanedimethanol, ethylene glycol, butanediol, propanediol and tetramethylcyclobutanediol.
6. Composition according to any of the preceding embodiments, characterized in that component B is a polyester based on succinic acid and butanediol.
7. Composition according to any of the preceding embodiments, characterized in that in component B the succinic acid is produced from renewable raw materials.
8. Composition according to any of the preceding embodiments, characterized in that component A has a weight-average molecular weight Mw of 10 to 100 kg/mol.
9. Composition according to any of the preceding embodiments, characterized in that component B has a weight-average molecular weight Mw of 40 to 500 kg/mol.
10. Composition according to any of the preceding embodiments, characterized in that component B has a weight-average molecular weight Mw of 80 to 400 kg/mol.
11. Composition according to any of the preceding embodiments, characterized in that component A is a polyester based on terephthalic acid and a mixture of isosorbide, cyclohexanedimethanol and ethylene glycol.
12. Composition according to embodiment 11, characterized in that in component A the diol component contains 5 to 60 mol % of isosorbide and 5 to 80 mol % of cyclohexanedimethanol, in each case based on the diol component.
13. Composition according to any of the preceding embodiments, characterized in that component C is talc having a median particle size $d_{50}$ of 0.8 to 2.0 μm.
14. Composition according to any of the preceding embodiments containing
    65% to 72% by weight of component A,
    18% to 28% by weight of component B and
    4% to 10% by weight of component C.
15. Composition according to any of the preceding embodiments further containing as component D 0.1% to 10% by weight of at least one polymer additive from the group consisting of flame retardants, anti-drip agents, flame retardant synergists, smoke inhibitors, lubricants and demolding agents, nucleating agents, antistats, conductivity additives, stabilizers, flow promoters, phase compatibilizers, impact modifiers and dyes and pigments.
16. Compositions according to any of the preceding embodiments consisting of components A to D.
17. Process for producing a molding compound, characterized in that the constituents of a composition according to any of embodiments 1 to 16 are mixed with one another at a temperature of 200° C. to 320° C.

18. Molding compound obtained by a process according to embodiment 17.

19. Molded article obtainable from a composition according to any of embodiments 1 to 16 or from a molding compound according to embodiment 18.

EXAMPLES

1. Formulation Components

Component A-1: Copolyester based on about 52% by weight of terephthalic acid, about 16% by weight of isosorbide, about 25% by weight of cyclohexanedimethanol and about 7% by weight of ethylene glycol having a melt volume flow rate (MVR) of about 13 cm³/[10 min]. The MVR is measured according to ISO 1133 (2012) at a temperature of 240° C., a loading of 5.00 kg and a preheating time of 4 minutes after a predrying for 16 h at a temperature of 110° C. in a recirculating air drier. Component A has a weight-average molecular weight $M_w$ of about 36 kg/mol measured by gel permeation chromatography in 1,1,1,3,3,3-hexafluoro-2-propanol in a concentration of 1 g/L using a polyethylene terephthalate standard.

Component A is commercially available as ECOZEN™ T120 (SK Chemicals).

Component A-2: Polyethylene terephthalate (for example PET from Invista, Germany) having an intrinsic viscosity of about 0.665 dl/g. The specific viscosity is measured in dichloroacetic acid in a concentration of 1% by weight at 25° C. The intrinsic viscosity is calculated from the specific viscosity according to the following formula.

Intrinsic viscosity=specific viscosity×0.0006907+ 0.063096

Component A-3: Polybutylene terephthalate having a melt flow rate (MFR) of 49 g/10 min measured according to DIN EN ISO 1133 (2012 version) at 250° C. and a loading of 2.16 kg.

Component B: Polyester based on succinic acid and butane-1,4-diol (polybutylene succinate) having a melt volume flow rate (MVR) of about 13 cm³/[10 min]. The MVR is measured according to ISO 1133 (2012) at 240° C., a loading of 5.00 kg and a preheating time of 4 minutes after a predrying for 16 h at a temperature of 110° C. in a recirculating air drier.

Component B is commercially available as BioPBS™ FZ91PB (PTTMCC Biochem Company Limited).

Component C-1: Talc, Jetfine™ 3CA from Imerys having an MgO content of 32% by weight, an $SiO_2$ content of 61% by weight and an $Al_2O_3$ content of 0.3% by weight, median particle size $d_{50}$=1.0 μm.

Component C-2: Glass fiber, CS 7968, chopped short glass fibers from Lanxess AG having an average fiber diameter of 11 μm and an average fiber length of 4.5 mm.

Component D-1: Irganox™ 1076 (BASF, Ludwigshafen, Germany) 2,6-di-tert-butyl-4-(octadecanoxycarbonylethyl) phenol Component D-2: Irgafos™ 168 (BASF, Ludwigshafen, Germany) tris(2,4-di-tert-butylphenyl) phosphite Component D-3: Demolding agent pentaerythritol tetrastearate 2. Production of the Molding Compounds The components were mixed in a ZSK25 twin-screw extruder from Coperion, Werner & Pfleiderer (Stuttgart, Germany) at a melt temperature of about 250° C. and a throughput of 20 kg/hour. After a predrying for 16 hours at a temperature of 110° C. in a recirculating air drier the molded articles were produced in an Arburg 270 E injection molding machine at a melt temperature of 260° C. and a mold temperature of 70° C.

3. Tests

MVR: Melt volume flow rate (MVR) measured according to ISO 1133 (2012) at a temperature of 240° C., a loading of 5.00 kg and a preheating time of 4 minutes after a predrying for 16 h at a temperature of 110° C. in a recirculating air drier.

Melt viscosity: Viscosity of the melt measured according to ISO 11443 (2014) method A2 at a temperature of 240° C. and a shear gradient of 1000 s$^{-1}$ after a pre-drying for 16 h at a temperature of 110° C. in a recirculating air drier.

Tensile elastic modulus: Tensile modulus determined according to ISO 527-2 (1996) on a dumbbell having dimensions of 170 mm*10 mm*4.0 mm at a test temperature of 23° C.

Breaking elongation: Breaking elongation determined according to ISO 527-2 (1996) on a dumbbell having dimensions of 170 mm*10 mm*4.0 mm at a test temperature of 23° C.

Izod impact strength: Average $M_w$ of the impact energy measured on a flat rod having dimensions of 80 mm*10 mm*4.0 mm according to ISO 180/1U (2013) at a test temperature of 23° C.

HDT A: Heat distortion temperature (HDT) measured according to ISO 75-2 (2013) method A (1.8 MPa) in M50 silicone oil on a flat rod having dimensions of 80 mm*10 mm*4.0 mm at an edge fiber expansion of 0.20% at a span of 64 mm in the flat edge position.

Surface quality: Result of visual assessment of the surface of test platelets having dimensions of 60 mm*40 mm*2 mm. The assessment is classified into two categories:

"+": Surface with high gloss and low, if any, talc/glass fiber streaking in the gate region.

"-": Surface with low gloss and high talc/glass fiber streaking in the gate region.

4.

TABLE 1

Inventive examples and comparative examples (V)

| Component | Example 1 | Example 2 | V3 | V4 |
|---|---|---|---|---|
| A-1 | 78.35 | 68.35 | 78.35 | 68.35 |
| B | 13.00 | 23.00 | 13.00 | 23.00 |
| C-1 | 8.00 | 8.00 | | |
| C-2 | | | 8.00 | 8.00 |
| D-1 | 0.15 | 0.15 | 0.15 | 0.15 |
| D-2 | 0.10 | 0.10 | 0.10 | 0.10 |
| D-3 | 0.40 | 0.40 | 0.40 | 0.40 |
| Test | | | | |
| MVR [cm³/[10 min]] | 11 | 15 | 10 | 15 |
| Melt viscosity [Pas] | 330 | 253 | 295 | 214 |
| Tensile elastic modulus [N/mm²] | 2341 | 2256 | 3309 | 3234 |
| Breaking elongation [%] | 51 | 35 | 6 | 4 |
| Izod impact strength [kJ/m²] | No fracture | No fracture | 30 | 33 |
| HDT A [° C.] | 93 | 90 | 101 | 97 |
| Surface quality | + | + | − | − |

TABLE 2

Comparative examples

| Component | V5 | V6 | V7 | V8 | V9 | V10 |
|---|---|---|---|---|---|---|
| A-1 | 86.35 | 58.35 | 51.35 | 41.35 | 72.82 | 63.09 |
| B | 5.00 | 33.00 | 40.00 | 50.00 | 24.53 | 21.26 |
| C-1 | 8.00 | 8.00 | 8.00 | 8.00 | 2.00 | 15.00 |
| D-1 | 0.15 | 0.15 | 0.15 | 0.15 | 0.15 | 0.15 |
| D-2 | 0.10 | 0.10 | 0.10 | 0.10 | 0.10 | 0.10 |
| D-3 | 0.40 | 0.40 | 0.40 | 0.40 | 0.40 | 0.40 |
| Test | | | | | | |
| MVR [cm$^3$/[10 min]] | 11 | 21 | 31 | 32 | 18 | 13 |
| Melt viscosity [Pas] | 457 | 200 | 169 | 156 | 226 | 246 |
| Tensile elastic modulus [N/mm$^2$] | 2522 | 2065 | 1961 | 1772 | 1737 | 2945 |
| Breaking elongation [%] | 41 | 24 | 8 | 7 | >100 | 17 |
| Izod impact strength [kJ/m$^2$] | No fracture | 140 | 86 | 66 | No fracture | 130 |
| HDT A [° C.] | 97 | 88 | 87 | 85 | 90 | 94 |
| Surface quality | − | + | + | + | + | + |

TABLE 3

Comparative examples

| Component | V11 | V12 | V13 | V14 |
|---|---|---|---|---|
| A-2 | 78.35 | 68.35 | | |
| A-3 | | | 78.35 | 68.35 |
| B | 13.00 | 23.00 | 13.00 | 23.00 |
| C-1 | 8.00 | 8.00 | 8.00 | 8.00 |
| D-1 | 0.15 | 0.15 | 0.15 | 0.15 |
| D-2 | 0.10 | 0.10 | 0.10 | 0.10 |
| D-3 | 0.40 | 0.40 | 0.40 | 0.40 |
| Test | | | | |
| MVR [cm$^3$/[10 min]] | not measured | not measured | 87 | 92 |
| Melt viscosity [Pas] | 104 (270° C.) | 85 (270° C.) | 143 | 122 |
| Tensile elastic modulus [N/mm$^2$] | 3415 | 3096 | 2808 | 2602 |
| Breaking elongation [%] | 6 | 7 | 3 | 4 |
| Izod impact strength [kJ/m$^2$] | 56 | 62 | 33 | 34 |
| HDT A [° C.] | 74 | 75 | 147 | 141 |
| Surface quality | − | − | + | + |

The inventive examples and comparative examples show that only the inventive compositions achieve the desired profile of properties.

It is apparent from the examples 1 to V4 that the use of talc as a filler makes it possible to achieve a particularly good impact strength and a high breaking elongation, while these mechanical properties are inadequate with glass fiber. In addition, only talc achieves a high surface quality.

If the proportion of component B is too low (V5), surface quality is inadequate and flowability very poor.

If in turn the proportion of component B is too high (V6, V7, V8), heat resistance and toughness are inadequate. Stiffness is also very low in V8.

If the proportion of component C is too low (V9) the desired stiffness is not achieved. If the proportion of the reinforcer (V10) is too high, toughness is in turn reduced.

If a noninventive polyester is employed as component A (V11 to V14), toughness is likewise insufficient. Surface quality is likewise impaired in V11 and V12.

The invention claimed is:

1. A composition containing:
   A) 60% to 80% by weight of a polyester based on terephthalic acid and at least one dianhydrohexitol and a mixture of isosorbide, cyclohexanedimethanol and 7% by weight of ethylene glycol, wherein component A has a weight-average molecular weight Mw measured by gel permeation chromatography in 1,1,1,3,3,3-hexafluoro-2-propanol using a polyethylene terephthalate standard of 10 to 100 kg/mol,
   B) 10% to 30% by weight of a polyester based on succinic acid and at least one aliphatic, araliphatic or cycloaliphatic diol,
   C) 3% to 12% by weight of at least one mineral reinforcer based on talc.

2. The composition as claimed in claim 1, wherein component B is a polyester based on succinic acid and butanediol.

3. The composition as claimed in claim 1, wherein component B has a melt volume flow rate of 5 to 20 cm$^3$/10 min measured according to ISO 1133 in the 2012 version at 240° C. and a loading of 5 kg.

4. The composition as claimed in claim 1, wherein component A contains structural units derived from isosorbide which is produced from renewable raw materials.

5. The composition as claimed in claim 1, wherein component C is talc having a median particle size $d_{50}$ of 0.8 to 2.0 µm.

6. The composition as claimed in claim 1, containing 65% to 72% by weight of component A,
18% to 28% by weight of component B and
4% to 10% by weight of component C.

7. The composition as claimed in claim 1 further containing as component D 0.1% to 10% by weight of at least one polymer additive selected from the group consisting of flame retardants, anti-drip agents, flame retardant synergists, smoke inhibitors, lubricants and demolding agents, nucleating agents, antistats, conductivity additives, stabilizers, flow promoters, phase compatibilizers, impact modifiers, dyes, and pigments.

8. The composition as claimed in claim 1 consisting of components A to C.

9. A process for producing a molding compound, wherein the constituents of a composition as claimed in claim 1 are mixed with one another at a temperature of 200° C. to 320° C.

10. A molding compound obtained by the process as claimed in claim 9.

11. A molded article obtained from the composition as claimed in claim 1.

* * * * *